(12) United States Patent
Schoner et al.

(10) Patent No.: US 8,013,888 B2
(45) Date of Patent: Sep. 6, 2011

(54) METHOD AND SYSTEM FOR IMPLEMENTING FILM GRAIN INSERTION

(75) Inventors: Brian Schoner, Fremont, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1694 days.

(21) Appl. No.: 11/274,695

(22) Filed: Nov. 15, 2005

(65) Prior Publication Data

US 2006/0183275 A1    Aug. 17, 2006

Related U.S. Application Data (60) Provisional application No. 60/652,920, filed on Feb. 14, 2005.

(51) Int. Cl.
*G09B 9/00* (2006.01)
*G06K 9/66* (2006.01)

(52) U.S. Cl. ........................................ 348/122; 382/192

(58) Field of Classification Search .................. 348/122, 348/165, 615, 710, 470, 610, 448, 253, 199; 382/192, 215, 294, 253, 199, 104; 375/240.12, 375/240.18; 345/619, 419; 363/144
See application file for complete search history.

(56) References Cited

U.S. PATENT DOCUMENTS

| 5,546,461 | A  | * | 8/1996 | Ibaraki et al. | 380/217 |
| 5,742,355 | A  | * | 4/1998 | De Haan et al. | 348/607 |
| 2002/0001416 | A1 | * | 1/2002 | Zhou et al. | 382/268 |
| 2007/0098269 | A1 | * | 5/2007 | Kondo et al. | 382/224 |

OTHER PUBLICATIONS

D.E. Knuth, "The Art of Computer Programming," Addison Wesley 1998, vol. 2, pp. 120-140.
B. Sklar, "Digital Communications: Fundamentals and Applications," Prentice Hall 1988, pp. 546-549.
M. George et al., "Linear Feedback Shift Registers in Virtex Devices," XAPP210, vol. 1.2, Jan. 9, 2001, pp. 1-5.

* cited by examiner

*Primary Examiner* — Saeid Ebrahimi Dehkordy
(74) *Attorney, Agent, or Firm* — McAndrews, Held & Mallory, Ltd.

(57) ABSTRACT

Aspects of a system and method for processing video data may comprise, for each line of a field of an image, generating noise based on a current seed, inserting the generated noise in a current line of the field, and generating a new seed for processing a subsequent line of the field by shifting the current seed. The current seed may be used to generate a random number and the generated noise may be produced using this generated random number.

30 Claims, 6 Drawing Sheets

METHOD AND SYSTEM FOR IMPLEMENTING FILM GRAIN INSERTION

RELATED APPLICATIONS

This patent application makes reference to, claims priority to and claims benefit from U.S. Provisional Patent Application Ser. No. 60/652,920, entitled "Method and System for Implementing Film Grain Insertion," filed on Feb. 14, 2005, which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates generally to processing video information. More specifically, certain embodiments of the invention relate to a method and system for implementing film grain insertion.

BACKGROUND OF THE INVENTION

Film grain is formed during the creation of motion picture images. Film grain is most noticeable in high definition (HD) images and becomes a distinctive cinema trait that must be preserved through the whole image processing and delivery chain. Nevertheless, film grain preservation is a challenge for current encoders, because compression grains related to temporal prediction cannot be exploited. Because of the random nature of the film grain, visually lossless encoding is only achieved at very high bit rates. Lossy encoders tend to suppress the film grain when filtering the high frequencies typically associated with noise and fine texture.

Some film grain technologies explore an implementation that involves lookups from a large database. This approach may be very difficult for modern cost-sensitive DVD players. If film grain is added during decoding, the decoder has to write reference pictures to memory twice. In this regard, writing occurs once with grain, and again without grain to facilitate in-loop processing. Adding film grain during decoding also presents problems for video processes such as de-interlacing, MPEG artifact reduction such as de-blocking and de-ringing, and video enhancements such as sharpening and histogram equalization.

If film grain is added during display, some existing technologies recommend computation of an 8×8 average, which becomes problematic. For example, assign film grain during display will require reading each picture twice, buffering 7 lines of video, or passing parameters between decode and display. These tasks may be very difficult to coordinate properly. Adding film grain during display also creates problems for interlaced displays and if done improperly, temporal statistics of the film grain will be incorrect.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for implementing film grain insertion, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and system for implementing film grain insertion. Aspects of the method are provided, substantially as shown and described, for implementing film grain insertion. One embodiment of the invention may provide a method for processing video data comprising, for each line of a field in an image, generating noise based on a current seed, inserting the generated noise in a current line of the field, and generating a new seed for processing a subsequent line of said field by shifting said current seed. The current seed may be generated from a random number and the generated noise may be produced using this generated random number.

An embodiment of the present invention may provide a method for film grain insertion that may be used with any video system. The method may provide a generic computational approach that may be easily modified to accommodate the parameters of any video system. The method may be also modified depending on the desired magnitude of noise and frequency at which the system may be running.

Figure 1:
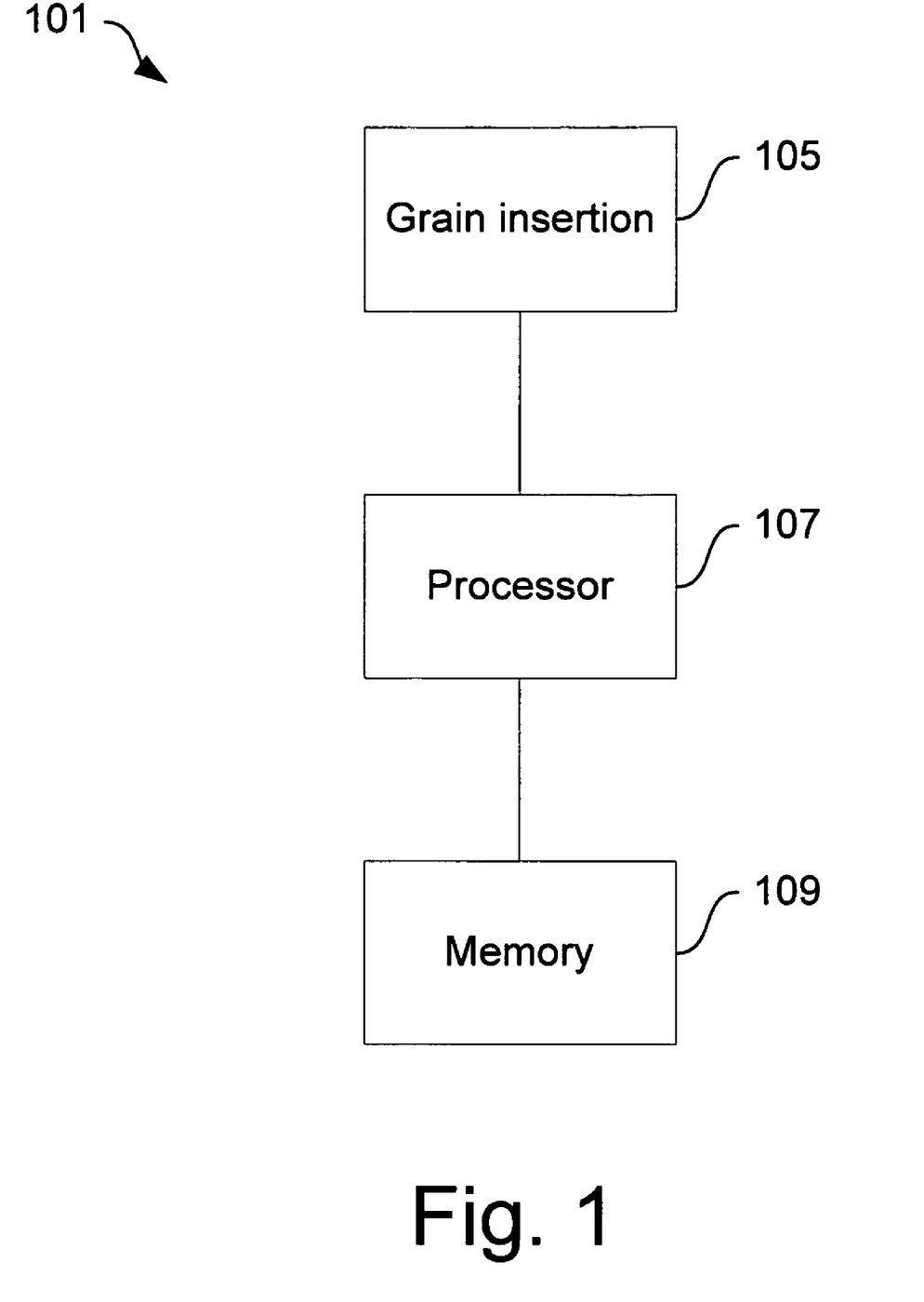
FIG. 1 illustrates a block diagram of an exemplary system architecture that may be utilized to implement film grain insertion, in accordance with an embodiment of the present invention.

FIG. 1 illustrates a block diagram of an exemplary system architecture that may be used to implement film grain insertion, in accordance with an embodiment of the present invention. Referring to FIG. 1, the system 101 may comprise a film grain insertion block 105, a processor 107, and a memory 109. The processor 107 may be a host processor, for example. In one embodiment of the invention, the processor 107 and the film grain insertion block 105 may be integrated in a single processor or chip. In various other embodiments of the invention, the processor 107 may be at least part of an integrated circuit (IC) core and the film grain insertion block 105 may be internal or external to the IC. In various other embodiments of the invention, the memory 109 may be internal or external to an IC comprising at least one of the processor 107 and the film grain insertion block 105.

Notwithstanding, the film grain insertion block 105 may be utilized in the system 101, and may be associated with a video display in the system 101. The film grain insertion block 105 may comprise suitable logic, code, and/or circuitry that may enable processing of video frames and/or fields. The film grain insertion block 105 may be utilized in a video network (VN). The processor 107 may comprise suitable logic, code, and/or circuitry that may enable it to control the operation of the film grain insertion block 105 and to transfer control information and/or data to and from the memory 109. The memory 109 may comprise suitable logic, code, and/or circuitry that may enable it to store control information, data, and information regarding video frames and/or fields and film grain insertion associated therewith. The control information, data, and information regarding video frames and/or fields may be, for example, the number of lines in the frame and/or field, whether the video is in progressive or interlaced format, and the size in pixels of the frame and/or field.

Figure 2:
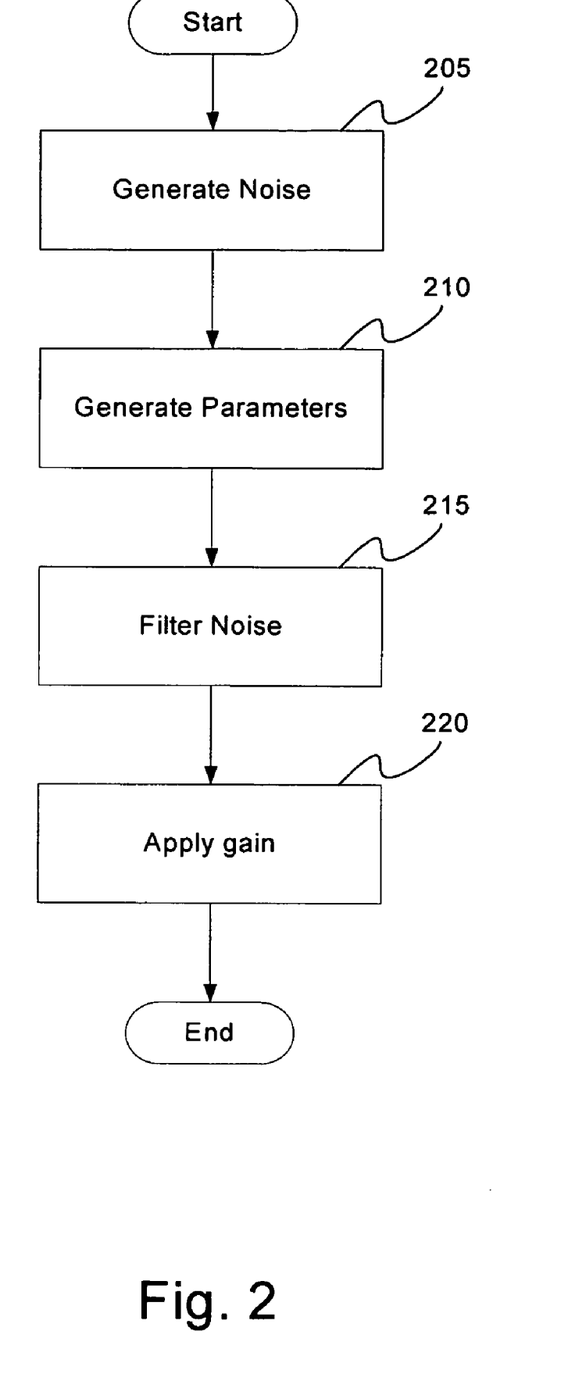
FIG. 2 illustrates a flow diagram of an exemplary method of implementing film grain insertion, in accordance with an embodiment of the present invention.

FIG. 2 illustrates a flow diagram of an exemplary method of implementing film grain insertion, in accordance with an embodiment of the present invention. The method shown in FIG. 2 may be a simplified high-level method associated with the present invention, a more detailed flow diagram of the exemplary method for implementing film grain insertion is explored hereinafter. Referring to FIG. 2, at a step 205, noise may be generated for each row of pixels in an image. The noise may be generated by determining a pseudo random noise generator (PRNG) seed. The PRNG seed may then be used to run the PRNG, where the PRNG may, for example, comprise a shift register that may be loaded with the PRNG seed, and logical operations may be performed on bits in specific positions within the register to produce a random bit. The bits in the shift register may then be shifted, and the produced bit may be inserted at the position emptied as a result of the shift, and added to the bits of the generated random number. This operation of the shift register may be repeated for the needed number of bits to produce a random number, for example, in this case 16 bits. The generated random number may then be used to perform a Gaussian lookup table (LUT) to generate noise, where the LUT may be constructed of values corresponding to values of a Gaussian distribution, where each LUT value may correspond to the possible values of the generated random numbers. The DC coefficient of the generated noise may then be removed.

At a next step 210, parameters such as the horizontal high cut frequency (h), the vertical high cut frequency (v), and scale factor parameters, may be generated. The horizontal high cut frequency may be the cut-off frequency for a horizontal filter, which may be designed using the parameter h. The vertical high cut frequency may be the cut-off frequency for a vertical filter, which may be designed using the parameter v. The scale factor parameter may be the scaling factor that may be desired for the output image. Therefore, the horizontal and vertical filters may be designed in step 210 using the associated parameters h and v, respectively. The filters may be, for example, two linear filters, one applied horizontally, and another applied vertically. In accordance with various embodiments of the invention, the parameters may comprise coefficients that may be utilized for the horizontal filtering, vertical filtering, and/or scaling. The noise generated at the earlier step 205 may then be filtered at a next step 215 using the designed filters. At a last step 220, gain may be applied to the filtered noise, which may be multiplied by a scaling factor and the amplified noise may then be added to the image.

Figure 3:
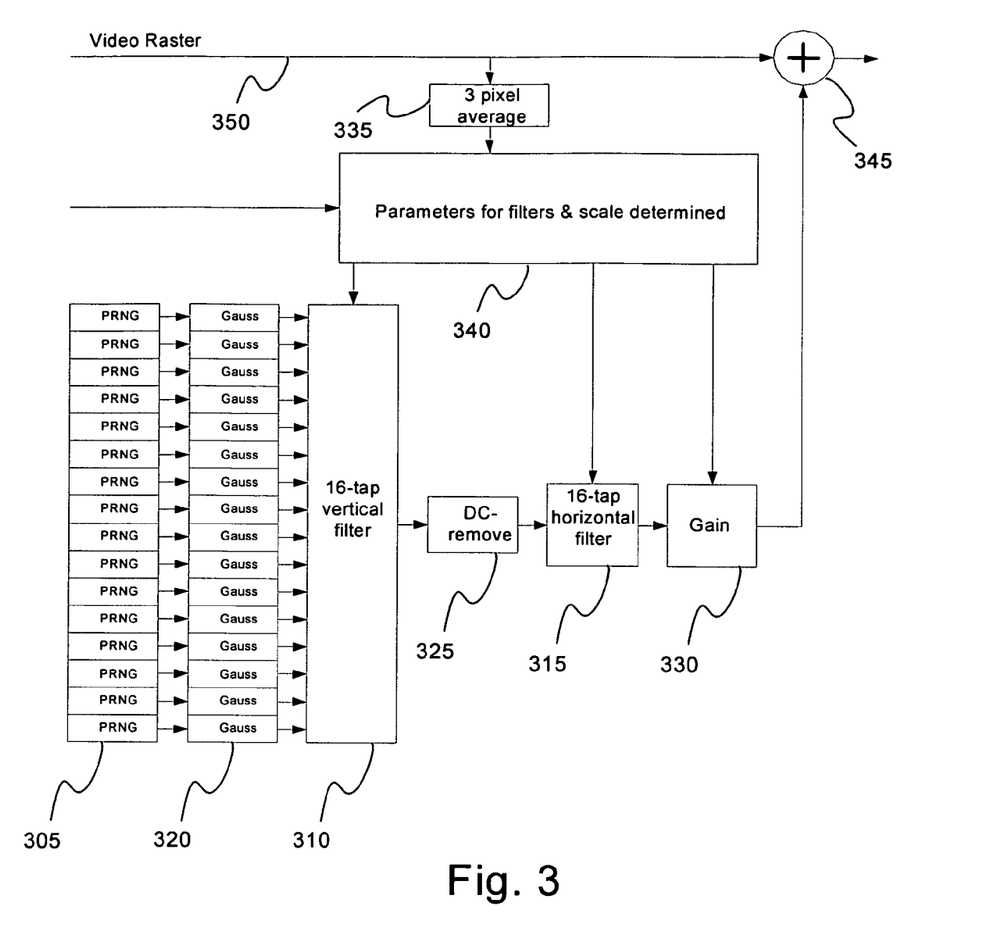
FIG. 3 illustrates a block diagram of an exemplary computational approach to film grain insertion, in accordance with an embodiment of the present invention.

FIG. 3 illustrates a block diagram of an exemplary computational approach to film grain insertion, in accordance with an embodiment of the present invention. Referring to FIG. 3, there is shown a PRNG block 305, a Gaussian distribution and seed LUT 320, a vertical filter 310, a DC component remover 225, a horizontal filter 315, a gain block 330, a video raster input 350, a 3 pixel average block 335, a parameter configuration block 340, and a summer 345. The illustrated process may be repeated for each color component in an image.

The PRNG block 305 may comprise suitable logic, circuitry, and/or code that may enable it to use a PRNG seed to generate a random number. In an exemplary embodiment of the invention, calculating the film grain offset for a pixel may utilize, for example, 16 16-bit PRNGs 305 for each of the three colors. A PRNG seed may be used to run each of the PRNG, where each PRNG may, for example, comprise a shift register that may be loaded with the PRNG seed, and logical operations may be performed on bits in specific positions within the register to produce a random bit. The bits in the shift register may then be shifted, and the produced bit may be inserted at the position emptied as a result of the shift, and added to the bits of the generated random number. This operation of the shift register may be repeated for the needed number of bits to produce a random number, for example, in this case 16 bits. The PRNGs may be implemented with linear feedback shift registers (LFSRs), which are well known and discussed, for example, in *Digital Communications: Fundamentals and Applications,* Bernard Sklar, Prentice Hall 1988, pp 546-549.

The Gaussian distribution and seed LUT 320 may comprise suitable logic and/or code that may enable it to generate noise using the random number generated by the PRNG block 320. The random number generated by the PRNGs 305 may be used to perform a Gaussian lookup table (LUT) to generate noise, where the LUT may be constructed of values corresponding to values of a Gaussian distribution, where each LUT value may correspond to a random number that may be generated by the PRNGs 305. The Gaussian probability distribution may be produced using any one of many known methods of producing probability distributions, one example of which is discussed in *The Art of Computer Programming,* 3rd Ed., Donald E. Knuth, Addison Wesley 1998, Vol. 2, pp 120-140.

The vertical filter 310 may comprise suitable logic, circuitry and/or code that may enable it to vertically filter the data input to it, which may be, as may be the case here, random noise generated by the Gaussian LUT 320. Filter coefficients may be generated and utilized to configure the vertical filter 310 for filtering.

The DC component removal block 325 may comprise suitable logic, circuitry and/or code that may enable it to remove the DC component from an input signal, which may comprise, as may be the case here, the generated random noise. In an embodiment of the present invention, the DC removal block 325 may comprise a low frequency cut-off, high pass filter. Utilizing DC removal may ensure removal of DC artifacts such as, for example, slow pulsing in brightness over time.

The horizontal filter 315 may comprise suitable logic, circuitry, and/or code that may enable it to horizontally filter the data input to it, which may be, as may be the case here, the generated random noise. Filter coefficients may be generated and utilized to configure the horizontal filter 315 for filtering.

The horizontal filter 315 and the vertical filter 310 may be, for example, 16-tap FIR filters. Vertical and/or horizontal filters with different numbers of taps may also be utilized. In certain instances, more taps may be used for the vertical and/or horizontal filters, in order to improve the quality of the noise. Alternatively, less taps may be used for the vertical and/or horizontal filters, which may use less hardware.

The gain block 330 may comprise suitable logic, circuitry and/or code that may enable it to amplify an input to it, which may comprise, as may be the case here, filtered noise data. A gain factor may be generated and utilized to configure the gain block 330 for amplifying the noise data.

The video raster 350 may comprise suitable logic, circuitry and/or code that may enable it to input video data in raster format, pixel by pixel. In accordance with an embodiment of the invention, three pixels from the video raster 350 may be used by the 3-pixel average block 335 to generate a pixel average. The 3-pixel average block 335 may comprise suitable logic, circuitry and/or code that may enable it to average 3 input pixels that may be grabbed from the video raster input 350. Various other embodiments of the invention may utilize an n-pixel average block, where n pixels are utilized to generate a pixel average, where n is greater than or equal to 2.

The parameter configuration block 340 may comprise suitable logic, circuitry and/or code that may enable it to utilize the output of the 3-pixel average block 335 to generate parameters for the vertical and horizontal filter and for the scaler. The parameter configuration block 340 may then output the generated parameters to the appropriate blocks, i.e., the vertical filter 310, the horizontal filter 315, and/or the gain block 330.

The summer 345 may comprise suitable logic, circuitry and/or code that may enable it to sum at least two signal that may be input into it. In an embodiment of the invention, the summer 345 inputs may comprise the video raster 350 and the film grain produced by the system, which may be the output of the gain block 330.

In operation, each of the PRNGs 305 may start with a different seed, and each may generate a uniform random number. The uniform random number may be then converted to a Gaussian random number utilizing the Gaussian distribution and seed LUT 320. As a result, 16 Gaussian random numbers may be generated, which may then be fed into the vertical filter 310. After vertically filtering the Gaussian random numbers, representing noise, the DC remove block 325 may remove the DC bias from the noise distribution. Removing the DC bias may ensure eliminating noise that may slowly pulse in brightness over time. The noise may then be horizontally filtered by the horizontal filter 315, and scaled by the gain block 330, then added back with the video 350.

When a video input comes in, at the start of every unit of the video such as, for example, a field or a frame, each of the PRNGs 305 may be seeded with a different random number seed. Using different random number seeds may ensure that noise is not repeated for every field/frame, and as a result the noise may look natural. In an embodiment of the present invention, with 3:2 pulldown video input, the film frames are split into top and bottom fields, and a different seed may be utilized for each of the fields. In another embodiment of the present invention, with 3:2 pulldown video input, two fields that make up a frame may use the same seed. Additionally, with 3:2 pulldown video, in instances where certain fields are repeated, the repeated fields may use the same seed to ensure the noise inserted into two identical fields is the same. In an embodiment of the present invention, the video stream may comprise interlaced content. Since the random number generation depends on the seed values used, interlaced patterns or 3:2 pulldown repeated patterns of noise may be generated by seeding each row of the noise generators with the appropriate values.

When going down a frame/field in raster format, noise may be generated for a line using the 16 PRNGs 305. For the next line, one line down, and to preserve the spatial relationship to the line above, the seeds for the PRNGs 305 may be shifted down a line and used to generate noise. At the beginning of each new line in a frame/field, the seeds for the PRNGs 305 may be shifted down one and reloaded. As a result, little or no on-chip RAM and no memory bandwidth may be needed in seeding the PRNGs 305 to generate noise for lines within a frame/field.

In an embodiment of the present invention, a rasterized approach may be utilized. A pixel order of left-to-right and top-to-bottom may be utilized to allow a simple cyclic redundancy check (CRC) to be calculated for the film-grain insertion offsets for each picture.

Using separate vertical and horizontal filters, 310 and 315, respectively, may allow filtering noise depending on the content of the input. For example, a certain type of input may require more filtering horizontally than vertically, while another type of input my require more filtering vertically than horizontally, and yet another type of input my require equal filtering horizontally and vertically.

Figure 4:
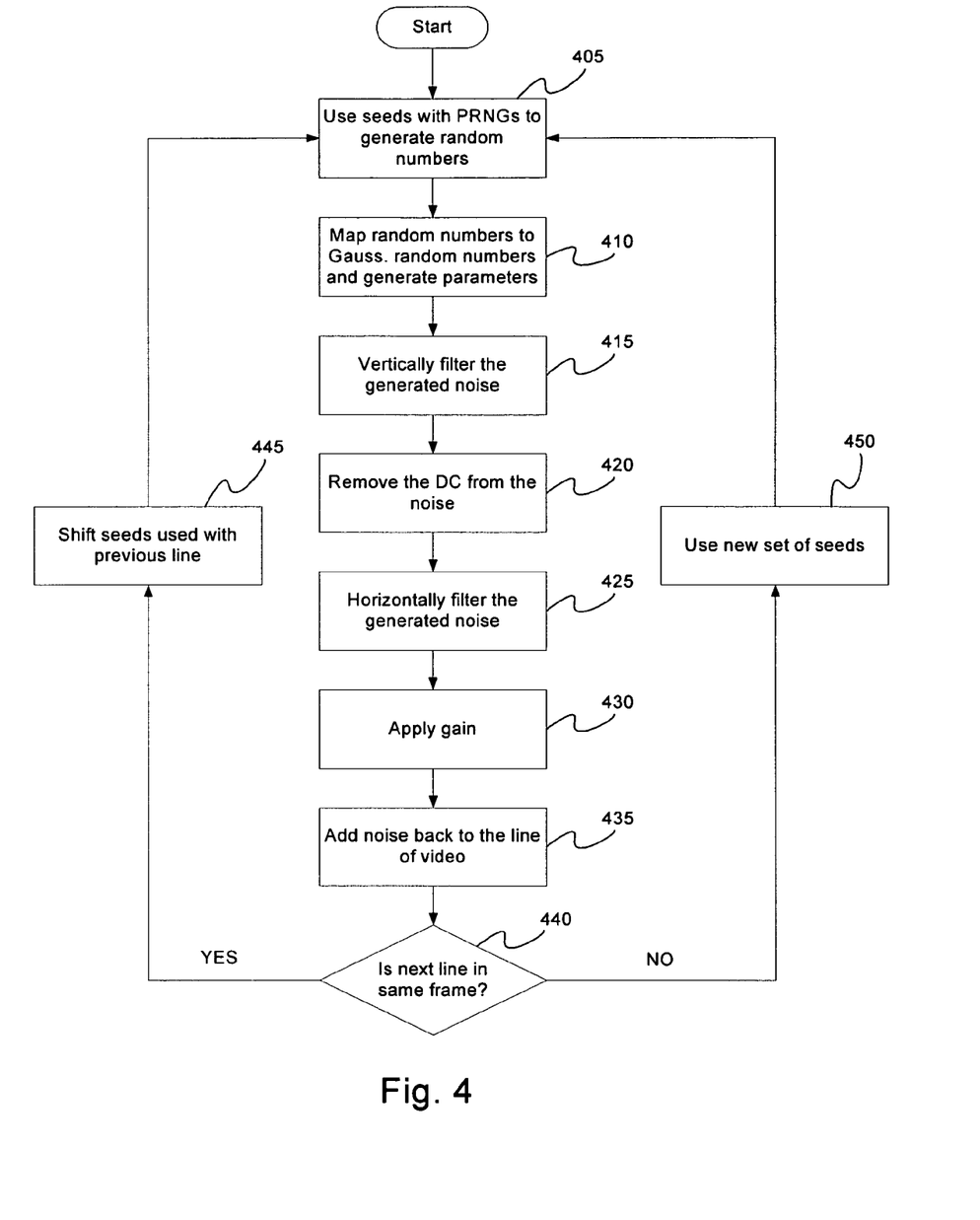
FIG. 4 illustrates a flow chart of an exemplary method of implementing film grain insertion, in accordance with an embodiment of the present invention.

FIG. 4 illustrates a flow chart of an exemplary method of implementing film grain insertion, in accordance with an embodiment of the present invention. At 405, different seeds may be used as input to PRNGs such as, for example, the PRNGs 305 of FIG. 3, to generate random numbers. For each row "R" of an image a different seed number "$e_R$" may be utilized. At a next step 410, the generated random numbers may be mapped to Gaussian random numbers to generate random noise. In an embodiment of the invention, a linear approximation to a Gaussian distribution may be used for mapping the random numbers generated in step 405 to Gaussian random numbers.

At the same time, parameters may be generated. The parameters may be, for example, the horizontal high cut frequency (h), the vertical high cut frequency (v), and scale factor parameters, that may be used by the horizontal filter, the vertical filter, and the scaler, respectively. In an embodiment of the invention, the filter parameters, h and v, may be in the range [0,12], and the filters used may be separable linear filters. Using linear filters may avoid block artifacts and may not be bound to block boundaries. Additionally, linear filters may avoid having to calculate block averages, since they filter linearly and not on a block level. Furthermore, using linear filters can be easily implemented in hardware or software and may be easily used for a rasterized approach.

The Gaussian random numbers, i.e., the random noise may be vertically filtered using, for example, a 16-top vertical filter, at 415, to generate a noise signal. The DC component of the noise signal may then be removed at 420. The noise may then be filtered horizontally using, for example, a 16-tap horizontal filter at 425.

In removing the DC component, a 64-bin frequency transform may be utilized to remove frequency components with a cutoff frequency of 0.016 Fs, for example. To achieve this, an IIR filter may be utilized such as, for example, the following IIR filter, H:

$$H=(1-z^{-1})/(1.0625-z^{-1}), \text{ and}$$

$$Y=X*(1-z^{-1})/(1.0625-z^{-1})$$

Where Y is the output when the input X is filtered using the IIR filter H.

Gain may then be applied to the noise at 430 using a scale factor such as, for example, the scale factor generated in step 410. The gain may be applied to the noise by multiplying it by the scale factor, for example. The noise may then be added back to the appropriate line in the video frame/field at 435. At 440 a determination may be made as to whether the next line is in the same frame/field as the previous line. If the next line is in the same frame/field, the seeds used in 405 may be shifted at 445 and used as the new seeds to generate noise for the next line. If the next line is in the next frame/field, new different seeds may be chosen at 450 and used to generate noise for the first line of the next frame/field.

The seed $e_R$, referred to hereinabove with regards to step 405, may, for example, be computed as follows:

$$e_R=Seed\_LUT[(ABS(POC)+pic\_offset<<5+\text{offset}[c]+R)\%256]XOR Seed\_LUT[(3R+37)\%256]$$

where Seed_LUT may be a predefined lookup table of random seed values. POC may be the picture order count of the current picture (image), which may be derived from the video stream as specified in the ITU-T Rec. H.264|ISO/IEC 14496-10 standard. The pic_offset may be a value read from the header of the video stream for instantaneous decoding refresh (IDR) pictures, for non-IDR pictures, pic_offset=0. The variable offset[c] may provide an offset value associated with the color "c" for which the seed is being generated. Each color component may have a different offset value.

There may be no dependency on PRNG states of previous rows, and therefore, seeds may be computed instantaneously for any row of noise. The same row seed may be used for a given row of a given picture. As the image is raster scanned, the row seeds may "scroll" with the image to create the necessary vertical correlation. In an embodiment of the present invention, the PRNGs may be re-seeded over several cycles during the horizontal blanking interval, which may reduce the cost of the Seed_LUT table. Each PRNG may be reset at the start of each line. A 16-bit PRNG may not repeat over a line time. A 16-bit polynomial like $(1+x+x^{15})$ may be used, for example. If 16-bit PRNGs are used, they may be seeded with the 16 LSBs of $e_R$. The output of the PRNGs may be a 16-bit random number. To avoid the possibility of correlation between successive outputs of the PRNGs, a bit decorrelator may be used on the 16-bit PRNG output. For example, the following may achieve the desired deccorelation:

Bit 11=bit 11 XOR bit 12
Bit 10=bit 12 XOR bit 13
Bit 9=bit 9 XOR bit 14
Bit 8=bit 8 XOR bit 15
Bit 7=bit 7 XOR bit 0
Bit 6=bit 6 XOR bit 1
Bit 5=bit 5 XOR bit 2
Bit 4=bit 4 XOR bit 3

Implementation of the film grain insertion may be done anywhere within a video system pipeline. Placing the film grain insertion relatively near the end of the video processing pipeline may yield favorable results, as it may add in the noise after any processing that may be done by the system such as, for example, sharpening or deinterlacing. As a result, the benefits of the signal processing functions may be maximized without the effects of the inserted noise. In instances when interlaced video content is being processed, the noise for film grain may be inserted after deinterlacing. This ensures that the deinterlaced content processes as little noise as possible, prior to insertion of the noise for the film grain.

The computational approach of the present invention may have reduced block artifacts. Using the separate linear horizontal and vertical filters may be one reason for the reduced block artifacts. Additionally, when there is a frequency change over edges, the computational approach of film grain insertion may handle such frequency changes smoothly, which may also be another result of using the separate vertical and horizontal filters.

In accordance with an embodiment of the invention, the computational approach may be optimized for single-line rasterized displays. As such, the computational approach may be independent of the decoder and as a result, the approach of the present invention may work with any video standard, and with any pre-existing decoding technology. Additionally, film grain may be inserted after video processing, and will not interfere with video sharpening, enhancement, or de-interlacing. The film grain may be continuous, and have no block artifacts, and may adapt smoothly to picture statistics without causing block effects such as, for example, blocky "halos" around objects. Furthermore, no additional reads or writes of video data may be required.

Various embodiments of the present invention may be backward compatible with other approaches, so that the present approach may utilize existing bitstream syntax and parameters, and may be visually indistinguishable. Additionally, the computational approach of the present invention may enable generating the grain noise in a random manner in real time, hence, eliminating the need to write to or read from memory, and consequently eliminating a need for large on-chip RAM.

Figure 5A:
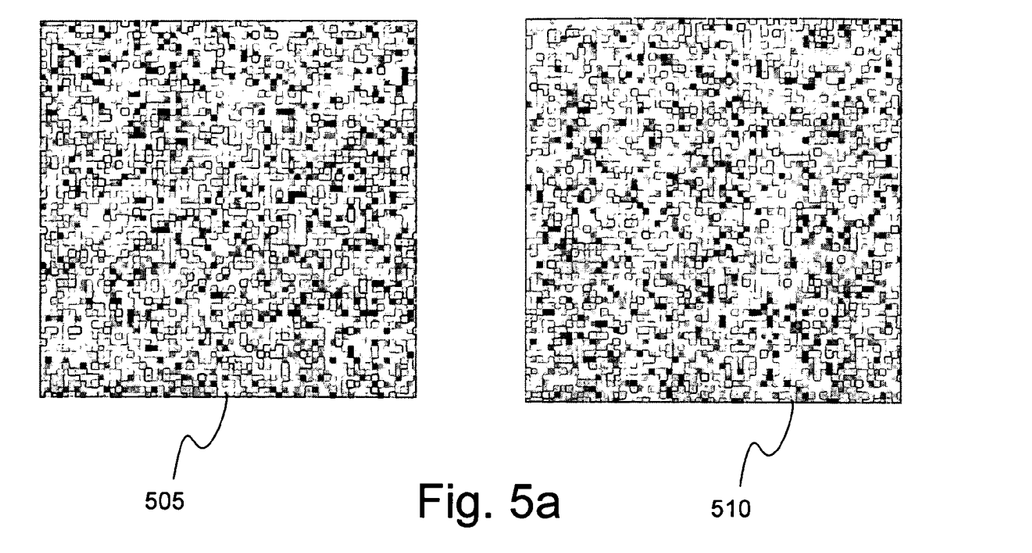
FIG. 5a illustrates a diagram of an exemplary comparison of grain insertion using an existing technology and the computational approach, in accordance with an embodiment of the present invention.

FIG. 5a illustrates a diagram of an exemplary comparison of grain insertion using an existing technology and the computational approach, in accordance with an embodiment of the present invention. Referring to FIG. 5a, 505 illustrates the film grain noise using the existing technology and 510 illustrates the film grain noise using the computational approach in accordance with and embodiment of the invention. In FIG. 5a, h=12, v=12. In this embodiment, the film grain noise is very fine and is equally filtered horizontally and vertically.

Figure 5B:
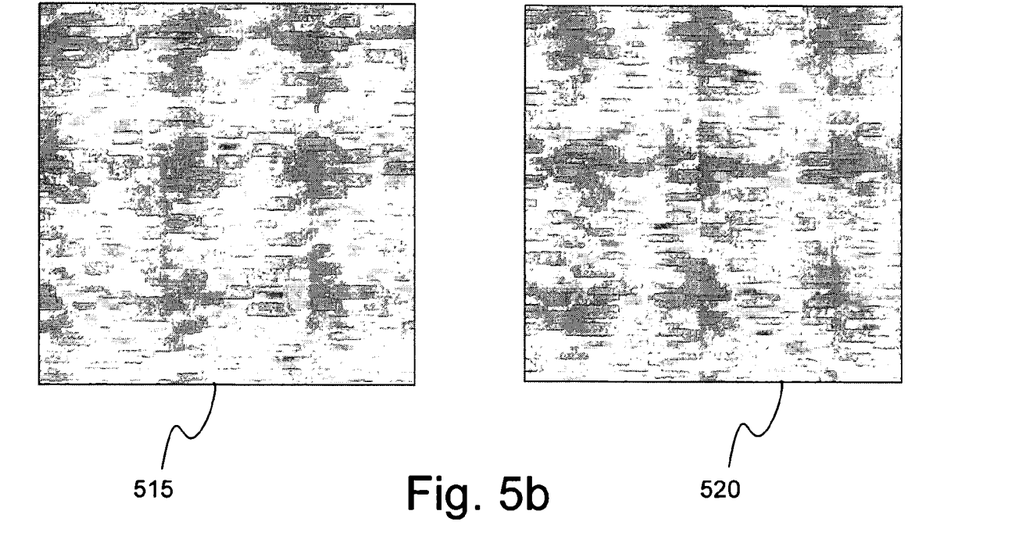
FIG. 5b illustrates a diagram of another exemplary comparison of an existing technology and the computational approach, in accordance with an embodiment of the present invention.

FIG. 5b illustrates a diagram of another exemplary comparison of an existing technology and the computational approach, in accordance with an embodiment of the present invention. Referring to FIG. 5b, 515 illustrates the existing technology, and 520 illustrates the computational approach in accordance with and embodiment of the invention. In FIG. 5b, h=1, v=8. In this embodiment, the film grain is filtered horizontally. Compared to the example in FIG. 5a, a stronger horizontal filter is applied to the film grain, and as a result the film grain is smoother in the horizontal direction.

Figure 5C:
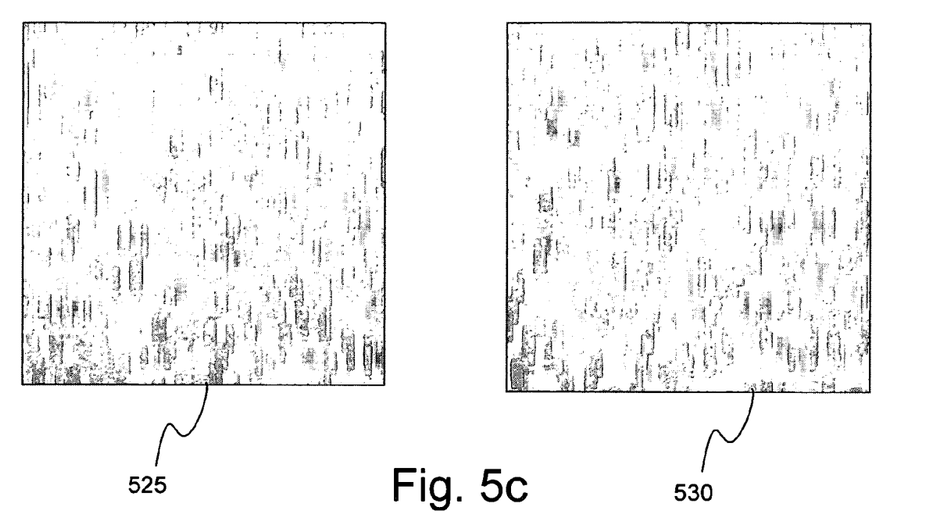
FIG. 5c illustrates a diagram of another exemplary comparison of the existing technology and the computational approach, in accordance with an embodiment of the present invention.

FIG. 5c illustrates a diagram of another exemplary comparison of the existing technology and the computational approach, in accordance with an embodiment of the present invention. Referring to FIG. 5c, 525 illustrates the existing technology, and 530 illustrates the computational approach in accordance with and embodiment of the invention. In FIG. 5c, h=8, v=1. In this embodiment, the film grain is filtered vertically. Compared to the example in FIG. 5a, a stronger vertical filter is applied to the film grain, and as a result the film grain is smoother in the vertical direction.

Figure 5D:
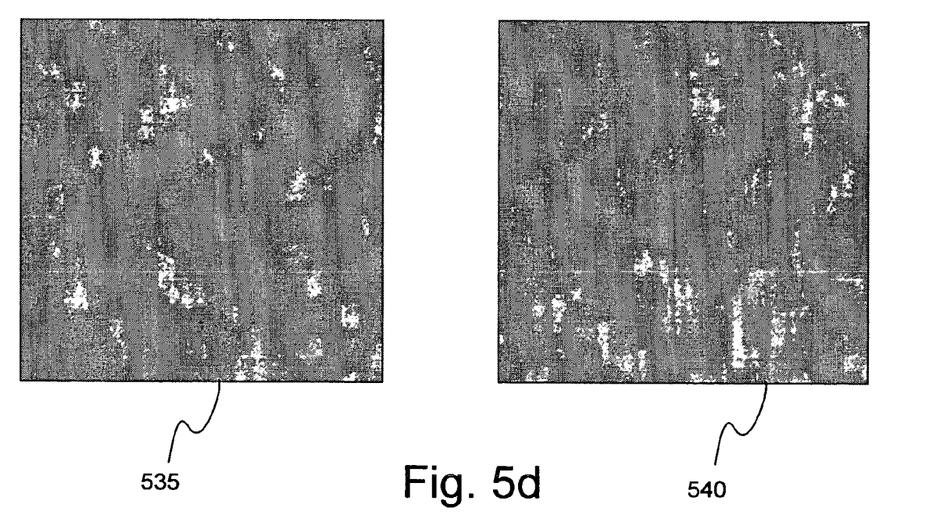
FIG. 5d illustrates a diagram of another exemplary comparison of the existing technology and the computational approach, in accordance with an embodiment of the present invention.

FIG. 5d illustrates a diagram of another exemplary comparison of the existing technology and the computational approach, in accordance with an embodiment of the present invention. Referring to FIG. 5d, 535 illustrates the existing technology and 540 illustrates the computational approach in accordance with and embodiment of the invention. In FIG. 5d, h=1, v=1. In this embodiment, the film grain is filtered horizontally and vertically. Compared to the example in FIG. 5a, a stronger vertical and horizontal filters are applied to the film grain, and as a result the film grain is smoother in both the vertical and the horizontal directions.

An embodiment of the invention may provide a machine-readable storage, having stored thereon, a computer program having at least one code section executable by a machine, thereby causing the machine to perform the steps as described herein for implementing film grain insertion.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:
   for each line of a field in an image:
      generating noise based on a current seed;
      inserting said generated noise in a current line of said field; and
      generating a new seed for processing a subsequent line of said field by shifting said current seed.

2. The method according to claim 1, further comprising generating a random number from said current seed.

3. The method according to claim 1, further comprising generating said noise from said generated random number.

4. The method according to claim 1, further comprising filtering said generated noise.

5. The method according to claim 4, further comprising generating filter coefficients for said filtering.

6. The method according to claim 4, further comprising at least one of the following:
   horizontally filtering said generated noise and vertically filtering said generated noise.

7. The method according to claim 1, further comprising removing a dc component from the generated noise.

8. The method according to claim 1, further comprising scaling said generated noise.

9. The method according to claim 8, further comprising generating scaling coefficients for said scaling.

10. The method according to claim 1, further comprising adding said generated noise to each pixel in said current line of said field.

11. The method according to claim 1, wherein said field is at least one of the following:
    a top field and a bottom field.

12. The method of claim 1, wherein the noise is independent of the lines of the field in the image.

13. The method of claim 1, wherein the noise is added to an uncompressed field.

14. The method of claim 1, wherein the image is display with the noise.

15. The method of claim 1, wherein the noise is generated in a pixel domain.

16. A system for processing video data, the system comprising:
    at least one processor that:
    for each line of a field in an image:
    generates noise based on a current seed;
    inserts said generated noise in a current line of said field; and
    generates a new seed for processing a subsequent line of said field by shifting said current seed.

17. The system according to claim 16, wherein the at least one processor generates a random number from said current seed.

18. The system according to claim 16, wherein the at least one processor generates said noise from said generated random number.

19. The system according to claim 16, wherein the at least one processor filters said generated noise.

20. The system according to claim 19, wherein the at least one processor generates filter coefficients for said filtering.

21. The system according to claim 19, wherein at least one of the following:
    the at least one processor horizontally filters said generated noise and the at least one processor vertically filters said generated noise.

22. The system according to claim 16, wherein the at least one processor removes a dc component from the generated noise.

23. The system according to claim 16, wherein the at least one processor scales said generated noise.

24. The system according to claim 23, wherein the at least one processor generates scaling coefficients for said scaling.

25. The system according to claim 16, wherein the at least one processor adds said generated noise to each pixel in said current line of said field.

26. The system according to claim 16, wherein said field is at least one of the following:
    a top field and a bottom field.

27. The system of claim 16, wherein the noise is independent of the lines of the field in the image.

28. The system of claim 16, wherein the noise is added to an uncompressed field.

29. The system of claim 16, wherein the image is display with the noise.

30. The system of claim 16, wherein the noise is generated in a pixel domain.

* * * * *